Feb. 27, 1934.  F. W. RUSSELL  1,948,886

FISHING REEL

Filed June 20, 1932  2 Sheets-Sheet 1

INVENTOR.
FREDERICK W. RUSSELL
BY *Munn+Co.*
ATTORNEYS.

Feb. 27, 1934. F. W. RUSSELL 1,948,886
FISHING REEL
Filed June 20, 1932 2 Sheets-Sheet 2

INVENTOR.
FREDERICK W. RUSSELL
BY
ATTORNEYS.

Patented Feb. 27, 1934

1,948,886

UNITED STATES PATENT OFFICE 1,948,886

FISHING REEL

Frederick W. Russell, Vallejo, Calif.

Application June 20, 1932. Serial No. 618,378

8 Claims. (Cl. 242—84.5)

My invention relates to improvements in fishing reels, and it consists of the combinations, constructions and arrangements hereinafter described and claimed.

An object of my invention is to provide a fishing reel in which the spool is rotated by the crank handle for winding in the line. Novel mechanism connects the crank handle with the spool and this mechanism includes brake shoes that are movable into engagement with a drum the instant the handle is turned for winding in the line. When the handle is not actuated, the spool is free to rotate in either direction.

The mechanism which connects the crank handle to the spool provides novel means for applying any desired braking tension on the spool up to the point of an actual operative connection between the crank handle and the spool. For example, when a fish is caught and starts to swim away, the fisherman can permit the spool to unwind without applying any braking force if desired. The handle remains stationary during the unwinding of the line. If the fisherman wishes to exert a braking tension on the spool, he can do so by turning the crank handle a slight distance in the direction in which the handle will move to wind up the line. Any desired amount of braking tension can be applied to the spool up to the point where the spool is directly connected to the handle. If a fisherman wishes to wind in any of the line, he can do so by turning the crank handle in the ordinary way for winding in the line. It will be seen from this that the one crank handle will permit automatic free spooling, will permit any amount of braking tension to be applied to the spool and will automatically connect the spool to the crank handle when the latter is turned for winding in the line.

Other objects and advantages will appear in the following specification, and the novel features of the device will be particularly pointed out in the appended claims.

My invention is illustrated in the accompanying drawings forming a part of this application, in which Figure 1 is a section along the line 1—1 of Figure 2, portions being shown in elevation;

Figure 1:
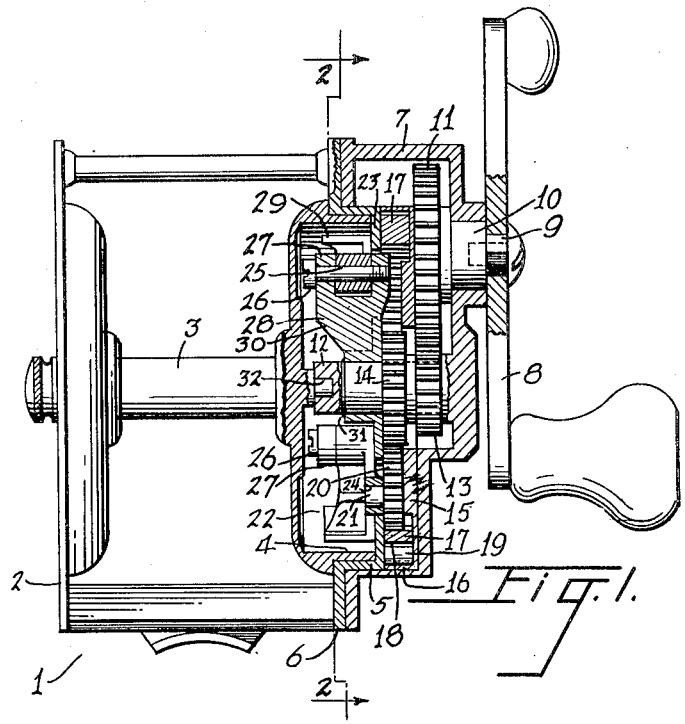

In carrying out my invention, I make use of a standard fishing reel which comprises a frame indicated generally at 1 and having a side 2 with a spool 3. I provide the spool 3 with a drum 4, and the drum rotates in a cylindrical portion 5 of a side 6. A casing 7 housing a gear train hereinafter described is connected to the side 6 and to the frame 1 by screws not shown.

It is best to describe the connection between a crank handle 8 and the spool 3 by starting with the handle and then describing the various parts that are disposed between the handle and the spool.

It will be noted from Figure 1 that the handle 8 is mounted upon a noncircular portion 9 of a rotating member 10. The member 10 carries a gear 11, and, therefore, a rotation of the handle will rotate the gear. The casing 7 carries an integral stub shaft 12, and on this shaft I mount a double gear 13—14. The gear 13 meshes with the gear 11 and these gears may be of different sizes for obtaining any desired ratio of gear movement. I have shown one of the standard ratios of 2 to 1; that is, the gear 13 is rotated twice for each revolution of the gear 11.

Figure 3:
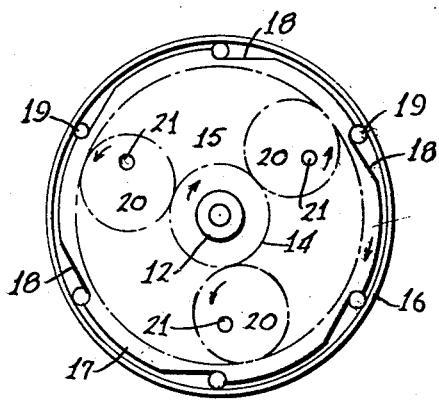
Figure 3 shows the gear train.

In the casing 7, I removably dispose a disc 15 having a flange 16 the disc being held against rotation by friction. Figure 3 shows how the flange 16 receives a ring gear 17 having teeth on its inner surface. The outer surface of the ring gear is provided with a number of recesses 18 having inclined walls and locking rollers 19 are placed in the recesses. The ring gear with the rollers act as a clutch which permits rotation of the gear in a clockwise direction, but prevents rotation in a counterclockwise direction.

Floating gears 20 are disposed between the ring gear 17 and the gear 14 and mesh with both. These floating gears have eccentric shafts 21 for receiving one end of a brake shoe, indicated generally at 22 in Figure 7. It is best to state that the side 6 has an inwardly-extending flange 23 integral with the cylindrical portion 5 and that this flange, together with the disc 15, bears against opposite faces of the floating gears 20 and holds them against movement in the direction of their axes.

I show three floating gears 20, although this number may be changed at will, and I also show three brake shoes 22. Each brake shoe is identical, and, therefore, a description of one will suffice.

Figure 5:
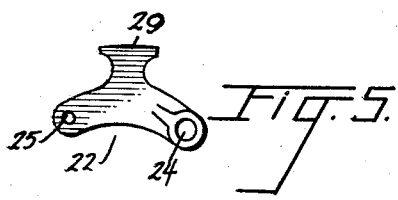
Figure 5 is a bottom plan view of one of the brake shoes.
Figure 6:
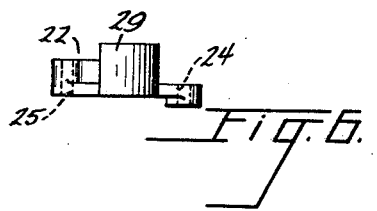
Figure 6 is a front view of the brake shoe.
Figure 4:
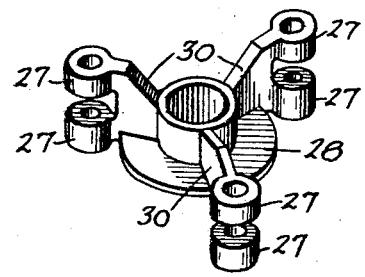
Figure 4 is a perspective view of the spider.
Figure 7:
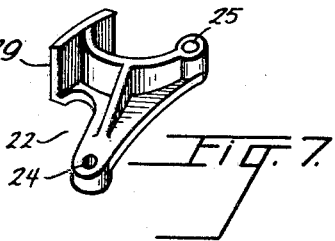
Figure 7 is a rear perspective view of the shoe.

In Figures 5, 6 and 7 I show how each brake shoe is provided with an opening 24 for receiving the shaft 21 and I further show how each brake shoe is provided with an opening 25 for receiving a screw 26 that is passed through aligned collars 27 of a spider 28 (see Figure 4). Each brake shoe has a braking portion 29 that is designed to be moved into contact with the inner surface of the drum 4.

Figure 2:
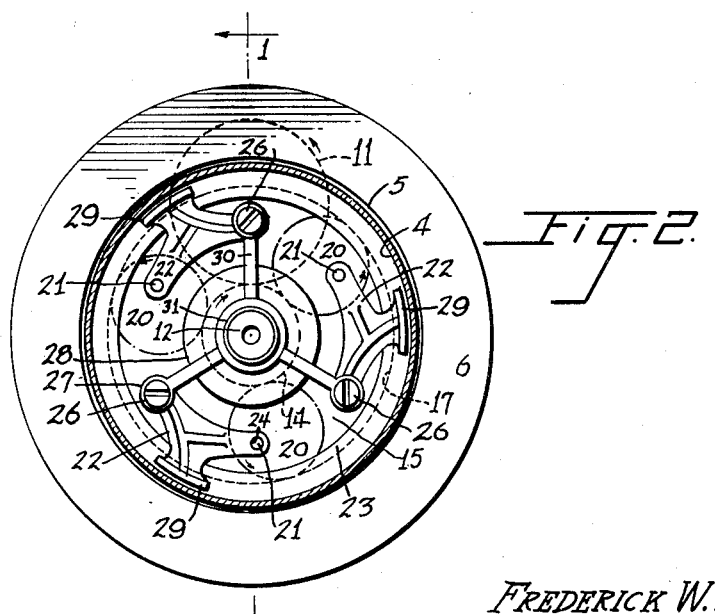
Figure 2 is a section along the line 2—2 of Figure 1, portions being shown in elevation.

The spider 28 is rotatably mounted on the shaft 12 (see Figure 1) and has arms 30 which carry the aligned collars 27. Figure 2 clearly shows how the brake shoes 22 are pivotally connected to the arms 30 and to the floating gears 20 by means of the screws 26 and the eccentric shaft 21 respectively.

From the foregoing description of the various parts of the device, the operation thereof may be readily understood.

In Figure 2, I indicate by arrows how the various gears are turned with respect to each other when the crank handle 8 is actuated for winding in the line. When the handle 8 is rotated in a counterclockwise direction when looking at Figure 2, the gear 11, through the medium of the gears 13 and 14, will rotate the floating gears 20 in a counterclockwise direction. The position of the shafts 21 on the floating gears will cause the shafts to move outwardly and to swing the brake shoes into engagement with the drum 4. The friction between the shoes and the drum can be varied at the will of the operator from a slight braking force up to a force which will actually connect the spool with the crank handle. When the shoes do not connect with the drum, the spool 3 is free to rotate in either direction. The instant the shoes do contact with the drum, a braking force is applied on the spool, and, as already stated, this force can be increased as desired.

When the fisherman wishes to wind in the line, he turns the crank handle 8 in the ordinary manner and this will rotate the gears in the manner shown in Figure 2 until the shoes 22 engage with the drum 4. A further movement will lock the shoes to the drum and will cause the drum to rotate with the gear 14 as a unit. This rotation will carry with it the floating gears 20 and the ring gear 17. A movement in the opposite direction is instantly prevented by the action of the rollers 19 binding the gear 17 to the flange 16. This binding action of the ring gear with the flange permits the floating gears to be turned for automatically freeing the brake shoes from the drum when the handle is freed. In this manner, the operator can instantly free the spool from the crank handle at any time desired.

It will therefore be seen that all of the movements desired by the fisherman can be obtained from the same crank handle that is used in winding in the line. There is no strain on the ring gear 17 when the parts are locked together because the action of the brake shoes on the drum is such as to tend to move the floating gears inwardly. It is obvious that the shape and the size of the fishing reel can be changed as desired. Free spooling of the reel is automatic when the reel is used for casting and does not need a previous disengagement of the spool from the handle. There is no spinning of the crank handle in the event of a strike, because of this automatic disengagement, as is the case with standard reels. The reeling-in feature, the free-spooling feature and the braking feature are all controlled from the one handle. If desired, removable friction surfaces can be provided on the portions 29 of the brake shoes so that when wear takes place, new braking surfaces can be added.

The spider 28 is held on the shaft 12 by a circular wire 31. The disc 15 is prevented from rotation with respect to the casing 7 by any means not shown. In case of wear, the disc 15, with the flange 16, can be renewed.

The spool 3 is rotatably mounted in the side 2 and in a recess 32 in the end of the shaft 12. For the purpose of clarity, I have shown the gear 11 meshing directly with the gear 14 in Figure 2. It will be noted, however, from Figure 1 that the gear 11 meshes with the gear 13 and that the gear 13 is slightly smaller in diameter than the gear 14. If desired, the gears 13 and 14 can be made the same size, and, in fact, this is indicated in Figure 2.

The crank handle 8 is shown in the drawings as being disposed at the top of the reel for the purpose of clarity although in actual construction it will be disposed at the lower forward side of the reel.

While I have shown only the preferred form of my invention, it should be understood that various changes or modifications may be made within the scope of the appended claims without departing from the spirit of the invention.

I claim:

1. In combination, a casing, a spool, a ring gear rotatable only in one direction, a driving gear, floating gears meshing with the first two gears and carrying eccentric stub shafts, a spider rotatable on the same axis as the first two gears, brake shoes connected to the stub shafts and to the spider, and a drum carried by the spool and engaged by the brake shoes.

2. In combination, a frame, a spool, a planetary gearing including a ring gear, floating gears, and a driving gear, means for locking the ring gear against movement in one direction, friction shoes operatively connected to the floating gears and being movable into engagement with the spool when the driving gear is actuated, the initial contact of the shoes on the spool acting as a braking force.

3. A fishing reel comprising a frame, a spool revolvable therein, an actuating handle, friction means engageable with the spool for rotating the same, and a connection between the handle and the friction means whereby upon manipulation of the handle the friction means are first rendered active on the spool and then revolve the latter, the connection including means automatically engaging with the frame for holding the spool against reverse movement while the friction means are engaged.

4. A fishing reel comprising a frame, a spool revolvable therein, an actuating handle, friction means engageable with the spool for rotating the same, and a connection between the handle and the friction means whereby upon manipulation of the handle the friction means are first rendered active on the spool and then revolve the latter, the connection including a planetary gear system with a ring gear and means for locking the latter to the frame against reverse movement.

5. In combination, a casing, a spool, a ring gear in the casing, a driving gear, floating gears meshing with the first two gears and carrying eccentric stub shafts, brake shoes for the spool and an operative connection between the brake shoes and the eccentric stub shafts whereby the brake shoes are rendered active upon the initial movement of the stub shafts.

6. In combination, a casing, a spool, a planetary gear system, brake shoes for the spool and an operative connection between the planetary gear system and the brake shoes whereby the latter are rendered active upon the initial movement of the planetary system with means for locking the planetary system against reverse movement while the shoes are active.

7. In combination, a revolvably mounted brake drum, a spider mounted coaxially therewith, brake shoes pivoted in the spider arms and engageable with the drum and a planetary gear system having means acting on the brake shoes for effecting the engagement when the gear system is actuated.

8. In combination, a revolvably mounted brake drum, a spider mounted coaxially therewith, brake shoes pivoted in the spider arms and engageable with the drum and floating gears having eccentric pins connected to the brake shoes for effecting the engagement when the gears are rotated.

FREDERICK W. RUSSELL.